United States Patent [19]

Hongo et al.

[11] Patent Number: 5,592,652
[45] Date of Patent: Jan. 7, 1997

[54] SINGLE-CHIP MICROCOMPUTER SYSTEM HAVING ADDRESS SPACE ALLOCATION HARDWARE FOR DIFFERENT MODES

[75] Inventors: Katsunobu Hongo; Tatsuya Oki, both of Itami, Japan

[73] Assignee: Mitsubishi Denki Kabushiki Kaisha, Tokyo, Japan

[21] Appl. No.: 435,565

[22] Filed: May 5, 1995

[30] Foreign Application Priority Data

May 6, 1994 [JP] Japan .................................. 6-094448

[51] Int. Cl.⁶ .................................................. G06F 12/00
[52] U.S. Cl. .................... 395/497.01; 395/405; 395/429; 395/497.04; 395/830; 395/833; 395/834; 364/DIG. 1
[58] Field of Search ................................... 395/405, 429, 395/497.01, 497.04, 830, 833, 834

[56] References Cited

U.S. PATENT DOCUMENTS

| | | | |
|---|---|---|---|
| 3,742,458 | 6/1973 | Inoue et al. | 395/497.04 |
| 4,374,411 | 2/1983 | Heatherington | 395/429 |
| 4,609,985 | 9/1986 | Dozier | 395/429 |
| 4,713,759 | 12/1987 | Yamagashi et al. | 395/405 |
| 4,839,795 | 6/1989 | Iwaksaki | 395/429 |
| 4,887,234 | 12/1989 | Iijima | 395/497.04 |
| 4,918,586 | 4/1990 | Niimura et al. | 395/429 |
| 5,210,850 | 5/1993 | Kelly et al. | 395/727 |
| 5,237,669 | 8/1993 | Spear et al. | 395/402 |
| 5,367,658 | 11/1994 | Spear et al. | 395/490 |
| 5,467,457 | 11/1995 | Kohda et al. | 395/429 |

Primary Examiner—Frank J. Asta
Attorney, Agent, or Firm—Lowe, Price, LeBlanc & Becker

[57] ABSTRACT

A computer system having an address space change-over circuit 8 capable of changing-over the allocation of an area of an internal ROM 22 in an address space either to an allocation in the address space most suitable for a single-chip microcomputer 20 or to an allocation in the address space more preferable for a case of connecting external memories 32, 33, and is capable of easily changing-over the address space allocation depending on whether the system operates as a single-chip microcomputer or operates as a system with external memories connected thereto.

8 Claims, 14 Drawing Sheets

SINGLE-CHIP MICROCOMPUTER SYSTEM HAVING ADDRESS SPACE ALLOCATION HARDWARE FOR DIFFERENT MODES

BACKGROUND OF THE INVENTION

1. Field of the invention

The present invention relates to a microcomputer system comprising a microcomputer as a semiconductor device integrated on a single chip, namely a single-chip microcomputer, and an external memory externally connected thereto, and particularly to address allocation of a read only memory (ROM) thereto.

2. Description of the Related Art

An example of configuration of a conventional microcomputer system using a single-chip microcomputer as a core and allocation of the address space thereof will be described below with reference to FIG. 1 through FIG. 5.

At first, internal configuration of a general single-chip microcomputer of the prior art and an example of configuration of external devices connected externally to the single-chip microcomputer will be described with reference to a block diagram of FIG. 1.

In FIG. 1, reference numeral 20 denotes the single-chip microcomputer (hereinafter, referred to simply as a microcomputer) which is constituted as an integrated circuit built on a single chip.

Provided inside the microcomputer 20, namely on the chip, are a central processing unit (hereinafter abbreviated as a CPU) 21, internal resources such as an internal ROM 22, an internal RAM 23 and the like, a mode set register 24, a control register 28, an input/output control unit (I/O) 30, a bus interface unit (bus I/F) 27 and others, that are connected with each other via an internal address bus 25 and an internal data bus 26.

The CPU 21 controls the microcomputer 20 as a whole and external devices to be described later, and carries out various operations.

The bus I/F 27 handles data exchanging between the microcomputer 20 and the outside thereof, and is connected to an external ROM 32, an external RAM 33, an exclusive IC 34 and other devices which are provided outside the microcomputer 20 and connected thereto via an external address bus 250 and an external data bus 260.

Reference numeral 29 denotes a peripheral device which is controlled by the CPU 21 through writing control data into the control register 28. Reference numeral 31 denotes a port group used in exchanging signals with the outside via the I/O 30.

FIG. 2 is a block diagram showing more specific configuration of the internal ROM 22.

In FIG. 2, reference numeral 36 denotes the body (internal ROM body) of the internal ROM 22, namely memory elements, and reference numeral 35 denotes an address decoder.

The address decoder 35 receives address signal AD0-ADn outputted from the CPU 21 via the internal address bus 25. When the CPU 21 outputs an address signal, the address decoder 35 decodes it and gives the decoded signal 41 to the internal ROM body 36, and the internal ROM body 36 outputs data stored at the corresponding address onto the internal data bus 26 as data signal DO-Dm.

Reference numeral 42 denotes an internal ROM area select signal which becomes in ineffective when an address allocated to the internal ROM 22 is outputted from the CPU 21, and thereby activates the internal RAM 23.

FIG. 3 is a schematic diagram showing an address allocation under an extended memory mode in the conventional microcomputer system. The extended memory mode is a mode where the external resources such as the external ROM 32, the external RAM 33, the exclusive IC 34 and the like that are connected to the microcomputer 20 externally are used in addition to the internal resources provided on the chip such as the internal ROM 22, the internal RAM 23, the control register 28 and the like. Single-chip mode, on the other hand, is a mode where only the above-mentioned internal resources provided on the chip are used.

In FIG. 3, an area indicated by reference numeral 1 shows an SFR (Special Function Register) area. The SFR area 1 ranges from address "0000H" (H indicates that, the number is hexadecimal) to "007FH", each address being allocated to the control register 28 or other element.

An area indicated by reference numeral 2 shows an internal RAM area of the conventional microcomputer system. The internal RAM area 2 ranges from address "0080H" to "0086H", to which addresses of the internal RAM 23 are allocated.

An area indicated by reference numeral 4 shows an interrupt vector area. The interrupt vector area 4 ranges from address "E000H" to "FFFFH", in which the addresses of jump destination addresses of interrupt handlers to be executed at generation of interrupt are stored.

An area indicated by reference numeral 37 shows an area other than the SFR area 1, the internal RAM area 2 and the interrupt vector area 4 described above. The area 37 is an area which can be used as an internal ROM area, namely an area whereto the addresses of the internal ROM 22 can be allocated.

FIG. 4 is a schematic diagram of an address allocation of FIG. 3 described above, wherein an area 39, which includes an area of 32K bytes from address "8000H" to "DFFFH" in the area 37 that can be used as the internal ROM area and the interrupt vector area 4, is allocated to the internal ROM area, while an area 38 of the remaining addresses from "0087H" to "7FFFH" is left reserved.

FIG. 5 is a schematic diagram of an address allocation of FIG. 3 described above, wherein an area 40, which includes an area of 60K bytes from address "1000H" to "DFFFH" in the area 37 that can be used as the internal ROM area and the interrupt vector area 4, is allocated to the internal ROM area, while the area 38 of the remaining addresses from "0087H" to "0FFFH" is left reserved.

In the conventional microcomputer system, under a mode other than the single-chip mode under which only the internal resources such as the internal ROM 22, the internal RAM 23 and the like are used, external resources such as the external ROM 32, the external RAM 33 and the like are connected as shown in FIG. 1, and such an address allocation as shown in FIG. 3 is basically employed. And the external memory is allocated to the portion remaining after allocating the internal ROM area to the area 37.

In the case shown in FIG. 4, for example, access to the internal ROM 22 by the CPU 21 is carried out by outputting an optional address within the range from the address "8000H" to "FFFFH" shown in FIG. 4 onto the internal address bus 25. This makes the internal ROM area select signal 42 be effective. At the same time, the address outputted from the CPU 21 is inputted to the address decoder 35 shown in FIG. 2 and decoded, so that the decoded signal 41 in order to access to the internal ROM 22 is outputted.

With the decoded signal 41 given, the internal ROM body 36 outputs data stored in the corresponding address onto the internal data bus 26.

In the case shown in FIG. 4, on the other hand, access to the external resources, particularly to the external ROM 32 and the external RAM 33, is made by the CPU 21 by outputting the address via the bus I/F 27 to the external address bus 250 and given to the external RAM 33. This causes the external RAM 33 to store the data outputted onto the external data bus 260 via the bus I/F 27 in the corresponding address, or to output the data from the corresponding address onto the external data bus 260.

The internal ROM area of the conventional microcomputer system is allocated within the area 37 that can be used as the internal ROM as indicated by reference numeral 39 in FIG. 4. As for the other portions that remain, external memories (ROM, RAM) or the like are allocated as the reserved area 38. In the conventional microcomputer, a memory sector of 64K bytes from address "0000H" to "FFFFH" (this sector of 64K bytes will be called a bank hereafter) is handled as a unit, and 256 banks from bank 0 to a bank 255 are prepared.

Shown in FIG. 3, FIG. 4 and FIG. 5 is bank 0. The internal ROM area 39 of 32K bytes and the internal ROM area of 60K bytes are all fixedly allocated in bank 0.

When 32K bytes of memory is allocated for the internal ROM area as shown in FIG. 4, an area from address "8000H" to "FFFFH" is used as the internal ROM area 39, and an area from address "0087H" to "7FFFH" becomes the reserved area 38 which is allocated for the external memory. Therefore, when RAM is used as the external memory, the RAM area which combines the internal and external areas becomes about 31K bytes of memory space from address "0080H" to "8000H".

Recently, however, microcomputer systems are in the trend of increasing storage capacity of the internal ROM 22 thereby causing the internal ROM area 39 to increase. When the internal ROM area 39 of FIG. 3 increases to 60K bytes, for example, the internal ROM area occupies from address "1000H" to "FFFFH" and the reserved area 38 occupies from address "0087H" to "1000H" as indicated by reference numeral 40 in FIG. 5. In the case of the example shown in FIG. 5, when RAM is used as the external memory similarly to the case described above it causes to the RAM area combining the internal and external areas to become as small as, or less than, about 4K bytes from address "0080H" to "0FFFH". The RAM area less than about 4K bytes is insufficient when temporary storage or saving of a large amount of data is required by a program.

The reason for employing such an address allocation, that all the memory areas for the internal ROM 22, the internal RAM 23 and the SFR are allocated in bank 0, is that this makes it easier to make a program under the single chip mode where the external memory is not used.

Thus when it is attempted to apply the address space of the conventional single-chip microcomputer just in this form to a microcomputer system comprising a single-chip microcomputer and an external memory, various problems arise. For this reason, it is desirable to employ such an arrangement that the address space allocation can be changed over depending on whether the single-chip microcomputer operates independently, namely under the single chip mode, or operates with the external memory connected thereto, namely under the extended memory mode. On the part of the manufacturer, because a single-chip microcomputer may be shipped as a complete product or shipped in a system after connecting the external memory thereto, it is desirable that either case can be easily provided for.

SUMMARY OF THE INVENTION

The present invention is devised for solving such problems described above. An object of the invention is to provide a computer system capable of easily changing over the address space allocation depending on whether it operates as a single-chip microcomputer, or operates as a system with an external memory connected thereto.

The microcomputer system of the invention has address space changing-over means capable of changing over the address space allocation of the internal ROM area either to an address space allocation most suitable for a single-chip microcomputer or to an address space allocation desirable for connecting an external memory.

The microcomputer system of the invention is made in such a configuration as changing-over of the mode by the address space changing-over means is carried out by a CPU according to the execution of a program of the microcomputer system itself, by the input of a signal from the outside or, in case where the internal ROM comprises a mask ROM, by presetting it in the manufacturing process.

Further, although it is desirable to fix the allocation of the interrupt vector area of the internal ROM in case where the mode switching is executed by the program, it is not necessary to fix the allocation in other cases and therefore the entire internal ROM area including the interrupt vector area is allocated in a more preferable address space.

Moreover, the internal ROM area is divided into a plurality of sections beforehand, and some of these sections are relocated in another area according to the execution of the program.

In the microcomputer of the invention, allocation of the internal ROM area in the address space is changed over to the optimum allocation either in a single-chip microcomputer or in a system with an external memory connected thereto.

The changing-over is carried out according to the necessity for executing a program of the microcomputer system itself, by the input of a signal from the outside according to whether the microcomputer system is to be shipped as a product in the form of a single-chip microcomputer or a system connecting with an external memory or, in case where the internal ROM comprises a mask ROM, by presetting it in the manufacturing process.

Further, in case where mode switching does not depend on the execution of the program, it is also made possible to improve the execution speed with exclusive programming by allocating the entire internal ROM area including the interrupt vector area in a more preferable address space.

Furthermore, as the internal ROM area is divided into a plurality of sections beforehand so that some of these sections can be allocated to another area according to the execution of the program, it is made possible to improve the execution speed with exclusive programming.

The above and further objects and features of the invention will more fully be apparent from the following detailed description with accompanying drawings.

DESCRIPTION OF THE PREFERRED EMBODIMENTS

The invention will now be described in detail below with reference to the accompanying drawings showing the preferred embodiments.

[First Embodiment]

Figure 6:
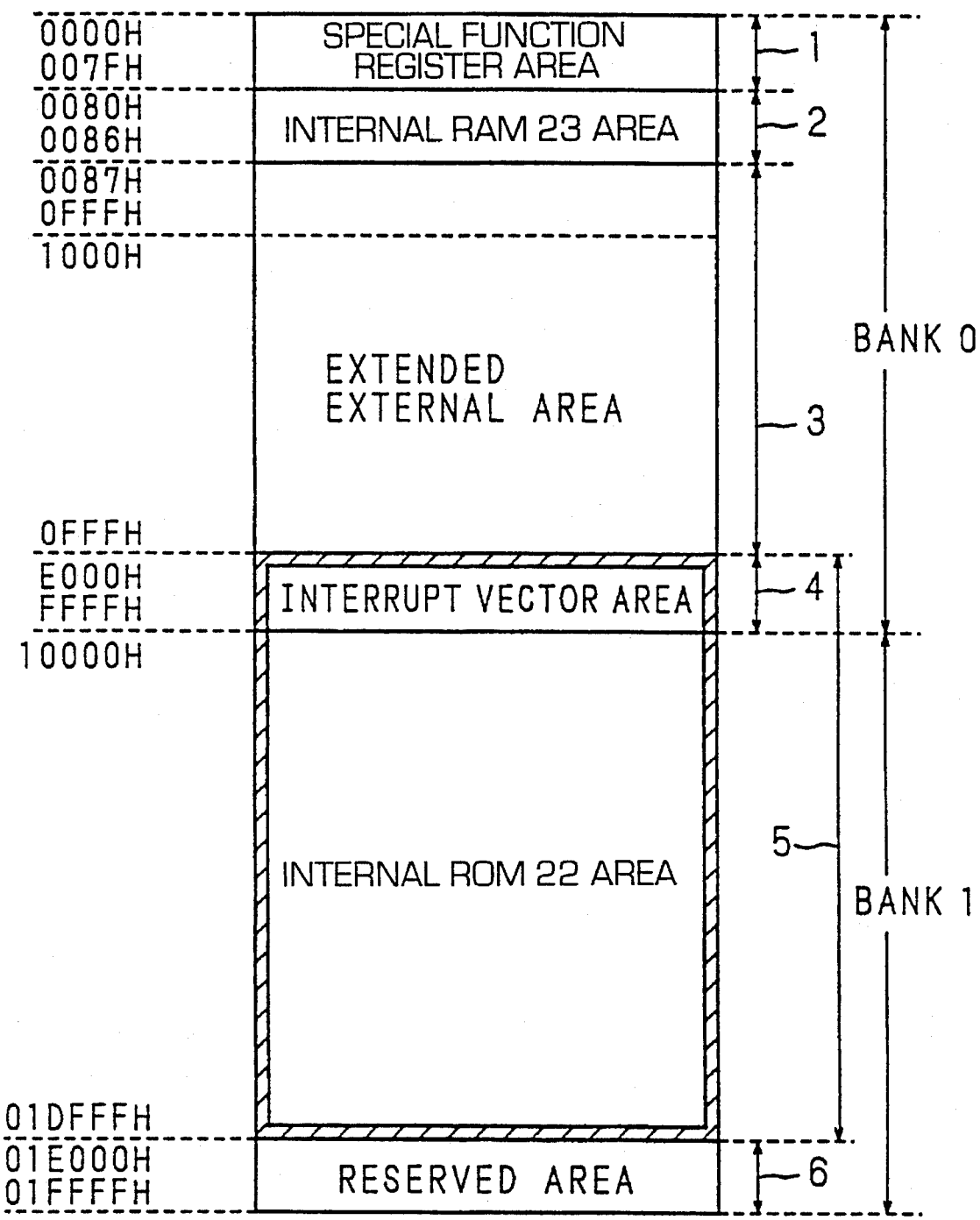
FIG. 6 is a schematic diagram of an address space map showing address allocation of the first embodiment of the microcomputer system of the invent ion.

FIG. 6 is a schematic diagram of an address space map showing address allocation of the first embodiment of the microcomputer system, namely a system comprising a single-chip microcomputer (hereinafter called a microcomputer) as a core and an external memory connected thereto, of the invention.

In FIG. 6, reference numeral 1 denotes an SFR (Special Function Register) area. The SFR area 1 ranges from address "0000H" to "007FH", to each of which a control register 28 or other devices are allocated respectively.

Reference numeral 2 denotes an internal RAM area. The internal RAM area 2 ranges from address "0080H" to "0086H", whereto addresses of an internal RAM 28 are allocated.

Reference numeral 3 denotes an extended external area to which external resources such as an external ROM 32, an external RAM 33 or the like are allocated. In the microcomputer system of the invention, because an internal ROM area is changed over to a bank 1, the extended external area is allocated to an area which was previously an internal ROM area and made empty.

Reference numeral 4 denotes an interrupt vector area in which jump destination addresses to interrupt handlers to be executed at generation of interrupts are stored. The interrupt vector area 4 ranges from address "E000H" to "FFFFH" of the end area of the internal ROM area of a bank 0 similarly to the prior art.

Reference numeral 5 denotes an internal ROM area relocated to a bank 1, and reference numeral 6 denotes a reserved area.

Figure 7:
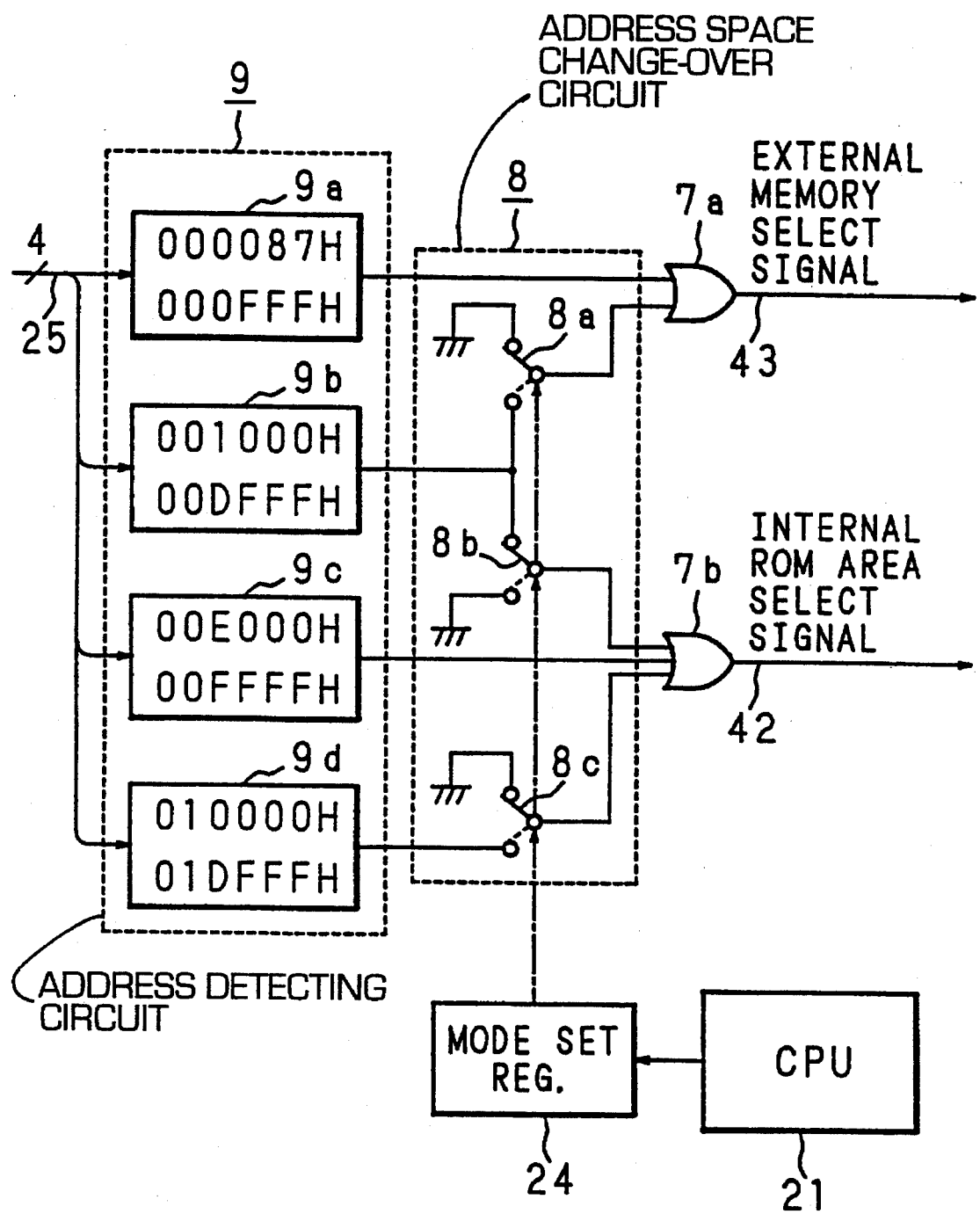
FIG. 7 is a block diagram showing an example of configuration of address space changing over means provided in the microcomputer system of the invention to enable the address area allocation shown in FIG. 6.

FIG. 7 is a block diagram showing an example of configuration of address space changing-over means provided in the microcomputer 20 of the microcomputer system of the invention to enable such address area allocation as described above.

Figure 1:
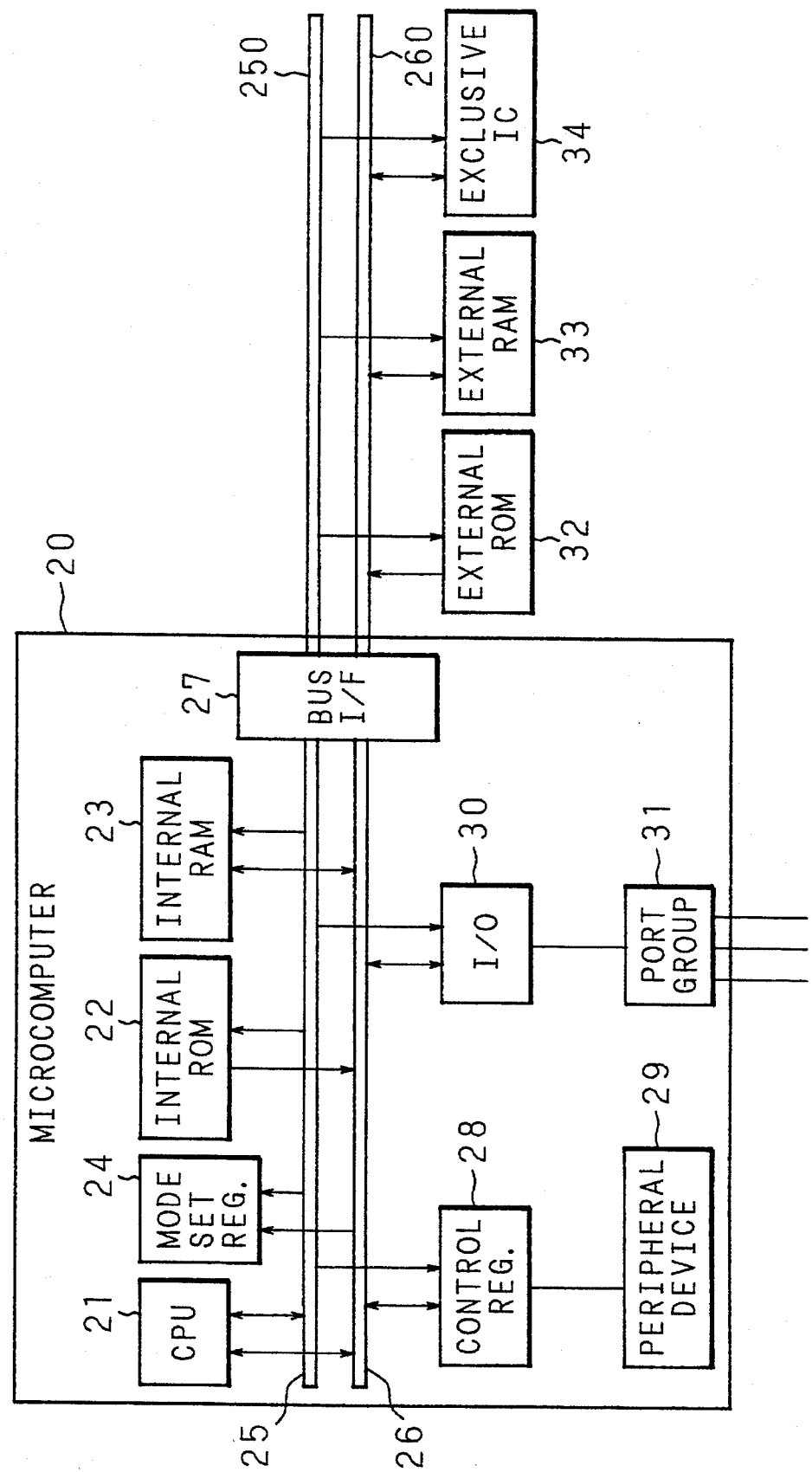
FIG. 1 is a block diagram showing the internal configuration of a single-chip microcomputer of a general microcomputer system of the prior art and an example of the configuration of peripheral devises externally connected thereto.

Overall configuration of the microcomputer system of the invention is basically the same as the conventional microcomputer system shown in FIG. 1 described previously.

In FIG. 7, reference numeral 9 denotes an address detecting circuit to which an address signal is given from an internal address bus 25. Provided in the address detecting circuit 9 are a first address detector 9a which outputs an "H" level signal when the address signal given from the internal address bus 25 ranges from address "000087H" to "000FFFH", a second address detector 9b which outputs an "H" level signal when the address signal given from the internal address bus 25 ranges from address "001000H" to "00DFFFH", a third address detector 9c which outputs an "H" level signal when the address signal given from the internal address bus 25 ranges from address "00E000H" to "00FFFFH" and a fourth address detector 9d which outputs an "H" level signal when the address signal given from the internal address bus 25 ranges from address "010000H" to "01DFFFH".

In FIG. 7, reference numeral 8 denotes an address space detector 9a, 9b, 9c, 9d described above is inputted. In the address space change-over circuit 8, three switching elements 8a, 8b, 8c are provided.

A first terminal of the switching element 8a is grounded, a second terminal is connected to an output signal of the second address detector 9b, and a common terminal is inputted to a 2-input OR gate 7a to be described later. A first terminal of the switching element 8b is connected to an output signal of the first address detector 9b, a second terminal is grounded and a common terminal is inputted to a 3-input OR gate 7 b to be described later. A first terminal of the switching element 8c is grounded, a second terminal is connected to an output signal of the fourth address detector 9d, and a common terminal is inputted to the 3-input OR gate 7b.

To one input terminal of the 2-input OR gate 7a, an output signal of the first address detector 9a is inputted, and to another input terminal, the common terminal of above-mentioned switching element 8a is connected. To the first input terminal of the 3-input OR gate 7b, the common terminal of the switching element 8b is connected, to the second input terminal, the output signal of the third address detector 9c is connected, and to the third input terminal, the common terminal of the switching element 8c is connected.

Although the switching elements 8a, 8b and 8c provided in the address space change-over circuit 8 are described in the above description as mechanical switches, it is merely for the sake of convenience of description. They can of course be constituted of transistors, gate elements or the like.

Figure 2:
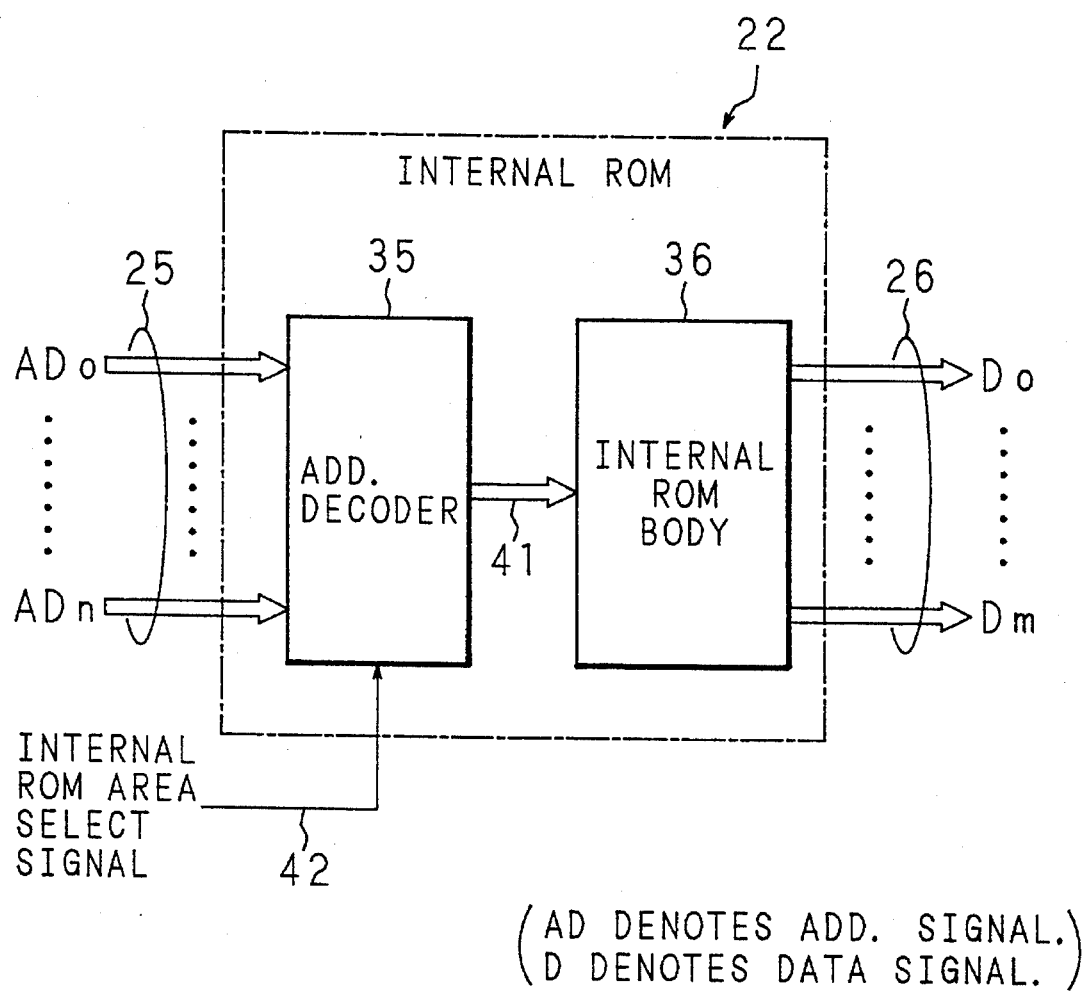
FIG. 2 is a block diagram showing more specific configuration of an internal ROM of the general single-chip microcomputer of the prior art.

The output signal 43 of the OR gate 7a is an external memory space select signal indicating that an address other than the internal ROM area is being accessed. The output signal of the OR gate 7b is a signal indicating that the address of the internal ROM is being accessed. In addition, the output signal of the OR gate 7b corresponds to the internal ROM area select signal 42 shown in FIG. 2.

The external memory space select signal 43 which is the output signal of the OR gate 7a is given to the bus I/F 27, and indicates, when it is at "H" level, that the external memory (the external ROM 32, the external RAM 33, etc.) is being accessed. The internal ROM area select signal 42 which is the output signal of the OR gate 7b is given to the address decoder 35 of the internal ROM 22, and indicates, when it is at "H" level, that the internal ROM 22 is being accessed.

Reference numeral 21 denotes a CPU of the microcomputer system of the invention, reference numeral 24 denotes a mode set register. To the mode set register 24, a value of a mode select bit for setting which address allocation of the internal ROM area or the extended external area by a program executed by the microcomputer system of the invention is written in by the CPU 21.

Figure 5:
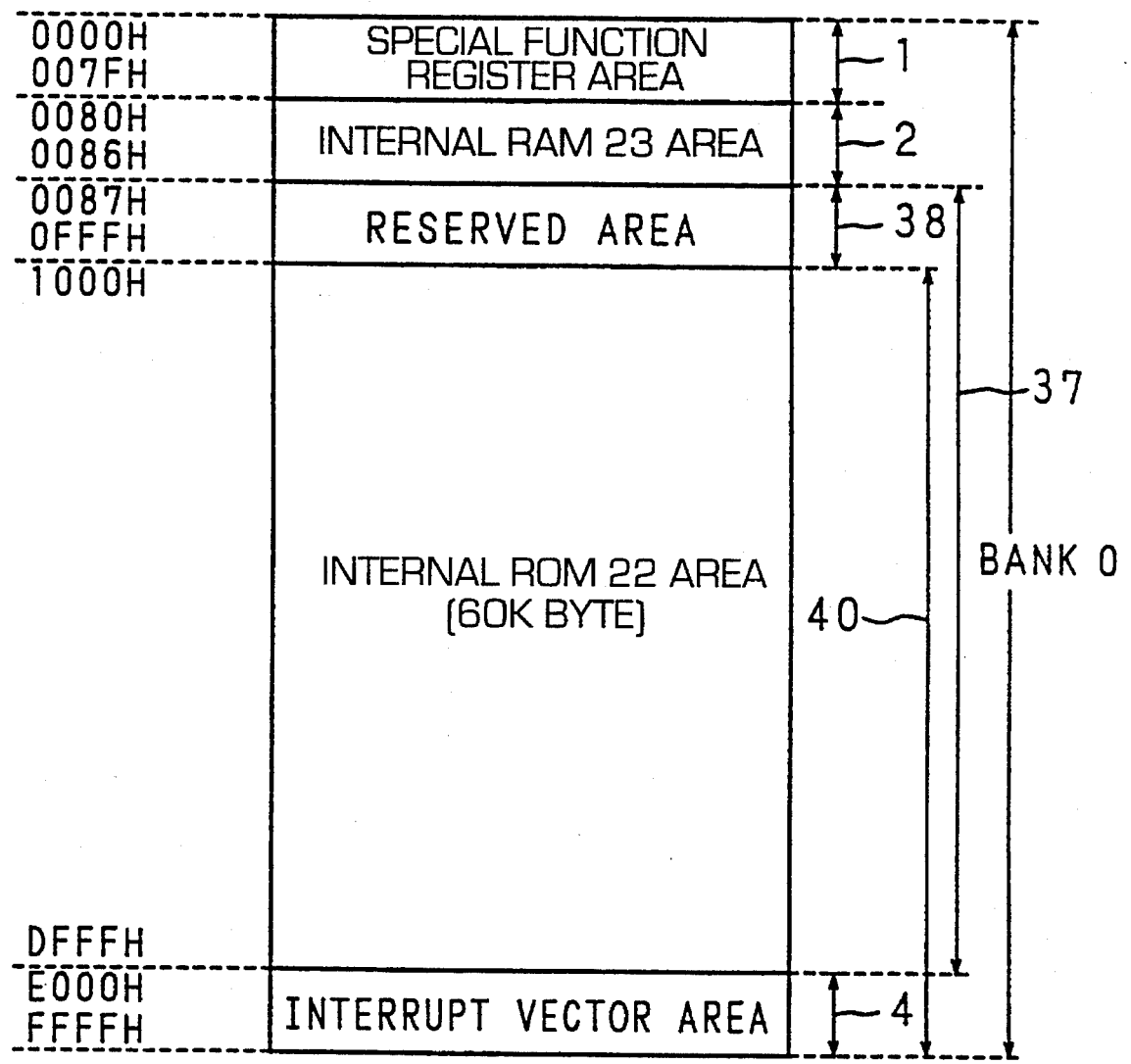
FIG. 5 is a schematic diagram showing further another example of an address allocation in the conventional microcomputer system under extended memory mode.

When the CPU 21 sets the mode select bit to "0" and writes it into the mode set register 24, such a memory allocation as 60K bytes are allocated to the built-in ROM in the conventional microcomputer system as shown in FIG. 5 is realized. When the CPU 21 sets the mode select bit to "1" and writes it into the mode set register 24, such a memory allocation as 64K bytes are allocated to the built-in ROM as shown in FIG. 6 is realized.

More specifically, when the CPU 21 sets the mode select bit to "0" and writes it into the mode set register 24 upon execution of the program by the microcomputer system of the invention, each switching element 8a, 8b, 8c of the address space change-over circuit 8 is connected as indicated by solid lines in FIG. 7; the switching element 8a is grounded, the switching element 8b is connected to the output signal of the second address detector 9b, and the switching element 8c is grounded. Conversely, when the CPU 21 sets the mode select bit to "1" and writes it into the mode set register 24, each switching element 8a, 8b, 8c of the address space change-over circuit 8 is connected as indicated by dashed lines in FIG. 7; the switching element 8a is connected to the output signal of the second address detector 9b, the switching element 8b is grounded, and the switching element 8c is connected to the output signal of the fourth address detector 9d.

Operation of the first embodiment of the microcomputer system of the invention will now be described below.

When the CPU 21 sets the mode select bit to "0" and writes it into the mode set register 24, such a memory allocation as 60K bytes are allocated to the built-in ROM in the conventional microcomputer system as shown in FIG. 5 is realized, as described previously. That is, the address space change-over circuit 8 is controlled so that, as indicated by solid lines in FIG. 7, the switching element 8a is grounded to output an "L" level signal to the OR gate 7a, the switching element 8b outputs the output signal of the second address detector 9b to the OR gate 7b, and the switching element 8c is grounded to output an "L" level signal to the OR gate 7b.

As a consequence, to the OR gate 7a, the output signal of the first address detector 9a and the "L" level signal are inputted, and the output signal of the OR gate 7a becomes the same as the output signal of the first address detector 9a. To the OR gate 7b, the output signal of the second address detector 9b, the output signal of the third address detector 9c and the "L" level signal are inputted, so that the output signal of the OR gate 7b becomes an OR signal of the output signal of the second address detector 9b and the output signal of the third address detector 9c.

Because of such operation of the address space changeover circuit 8, when the CPU 21 outputs an address signal in a range from address "000087H" to "000FFFH", the output signal of the OR gate 7a turns into "H" level. In other words, the OR gate 7a selects an area from address "000087H" to "000FFFH" in the bank 0 as the extended external area. When the CPU 21 outputs an address signal in a range from address "001000H" to "01DFFFH", on the other hand, the output signal of the OR gate 7b turns into "H" level. In other words, the OR gate 7b selects an area from address "00E000H" to "00FFFFH" in the bank 0 as the internal ROM area. This arrangement is equivalent to the memory area allocation shown in FIG. 5 wherein 60K bytes are allocated to the built-in ROM in the conventional microcomputer system.

On the other hand, when the CPU 21 sets the mode select bit to "1" and writes it into the mode set register 24, the address change-over circuit 8 is controlled so that, as indicated by dashed lines in FIG. 7, the switching element 8a outputs the output signal of the second address detector 9b to the OR gate 7a, the switching element 8b is grounded to output an "L" level signal to the OR gate 7b, and the switching element 8c outputs the output signal of the fourth address detector 9d to the OR gate 7b.

As a consequence, to the OR gate 7a, the output signal of the first address detector 9a and the output signal of the second address detector 9b are inputted, and the output signal of the OR gate 7a becomes the OR signal of these output signals. And to the OR gate 7b, the "L" level signal, the output signal of the third address detector 9c and the output signal of the fourth address detector 9d are inputted, so that the output signal of the OR gate 7b becomes the OR signal of the output signal of the third address detector 9c and the output signal of the fourth address detector 9d.

Because of such an operation of the address space change-over circuit 8, when an address signal in a range from address "000087H" to "00DFFFH" is outputted from the CPU 21, the OR gate 7a selects an area from address "000087H" to "00DFFFH" in the bank 0 as the extended external area. When an address signal in a range from address "00E000H" to "01DFFFH" is outputted from the CPU 21, the OR gate 7b selects an area from address "00E000H" to "01DFFFH" in the banks 0 and the bank 1 as the internal ROM area. In this case, the first 4K bytes of the 64K bytes in the internal ROM area are so shifted as to be allocated into the bank 0 and the remaining 60K bytes are so shifted as to be allocated into the bank 1 as shown in FIG. 6.

Thus because the addresses of the end area of the bank 0 whereto the interrupt vectors are allocated remains unchanged, interrupts can be handled similarly to the prior art.

[Second Embodiment]

Figure 8:
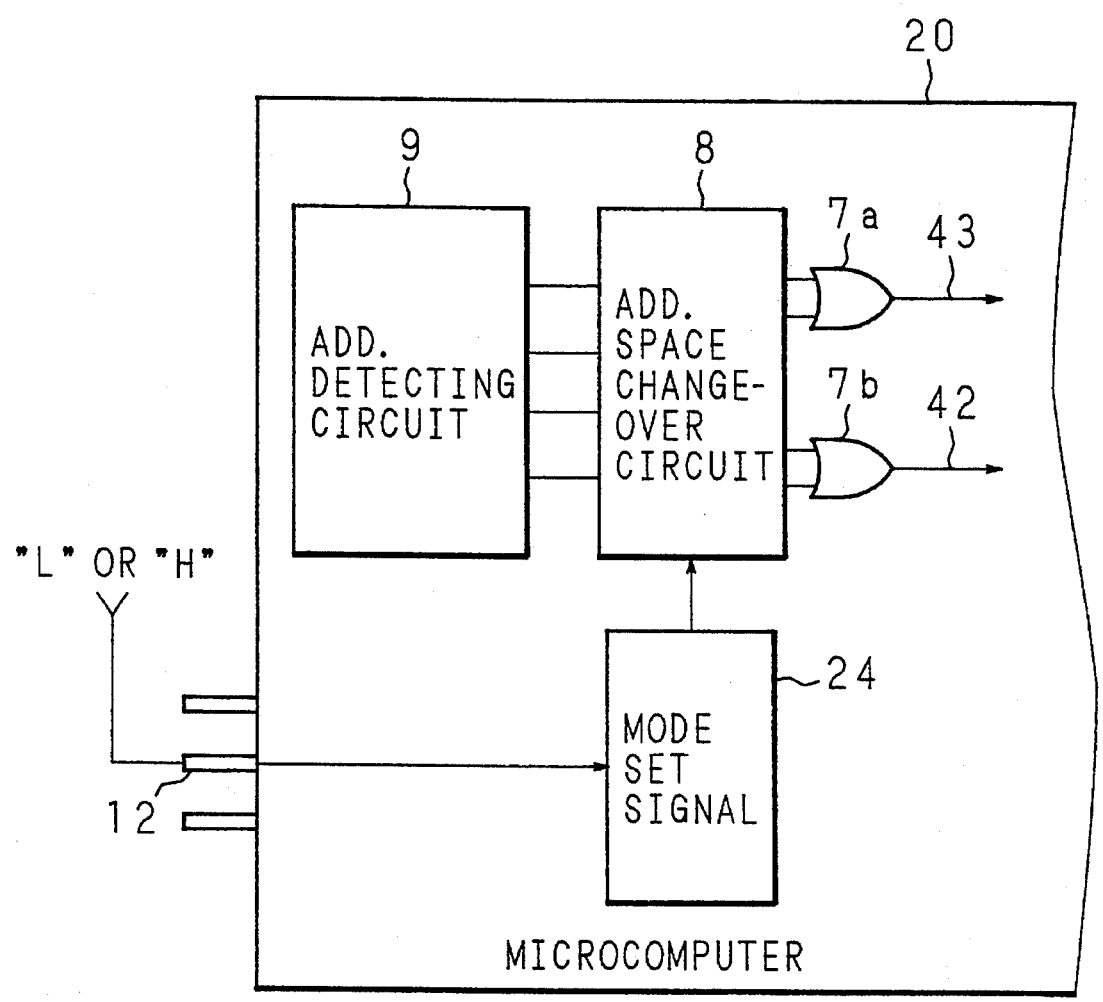
FIG. 8 is a block diagram showing the configuration of an essential portion of the second embodiment of the microcomputer system of the invention.

Although the first embodiment described above has such a configuration that the CPU 21 writes the mode set bit into the mode set register 24 in accordance to the execution of the program, different configuration may of course be employed. FIG. 8 is a block diagram showing a configuration of an essential portion of the second embodiment of such a microcomputer system of the invention.

In FIG. 8, reference numeral 12 denotes one of signal input terminals provided in a microcomputer 20 of the microcomputer system of the invention. In this embodiment, a level of an input signal from the signal input terminal 12 is written into the mode set register 24, not that the CPU 21 writes the mode set bit into the mode set register 24 as required during execution of the program.

By employing such a configuration, it is made possible to control the address space change-over circuit 8 and to change over the address space regardless of the program, by giving a signal of "H" level or "L" level to the signal input terminal 12 from the outside of the microcomputer 20 as required.

Also it is made possible to fix the signal input terminal 12 to the ground potential ("L" level) or to the power source potential ("H" level) before shipping, according to whether the microcomputer 20 is to be used independently, namely as a product, only under the single-chip mode by the user, or to be used only under the extended memory mode as a microcomputer system to which the external ROM 32, the external RAM 33 and other devices are connected.

[Third Embodiment]

Further in case where the internal ROM 22 of the microcomputer 20 comprises of a mask ROM, 1 bit therein can be used as the mode set bit so that the value of the bit is fixedly set to either "1" or "0" in advance in the manufacturing process.

Figure 9:
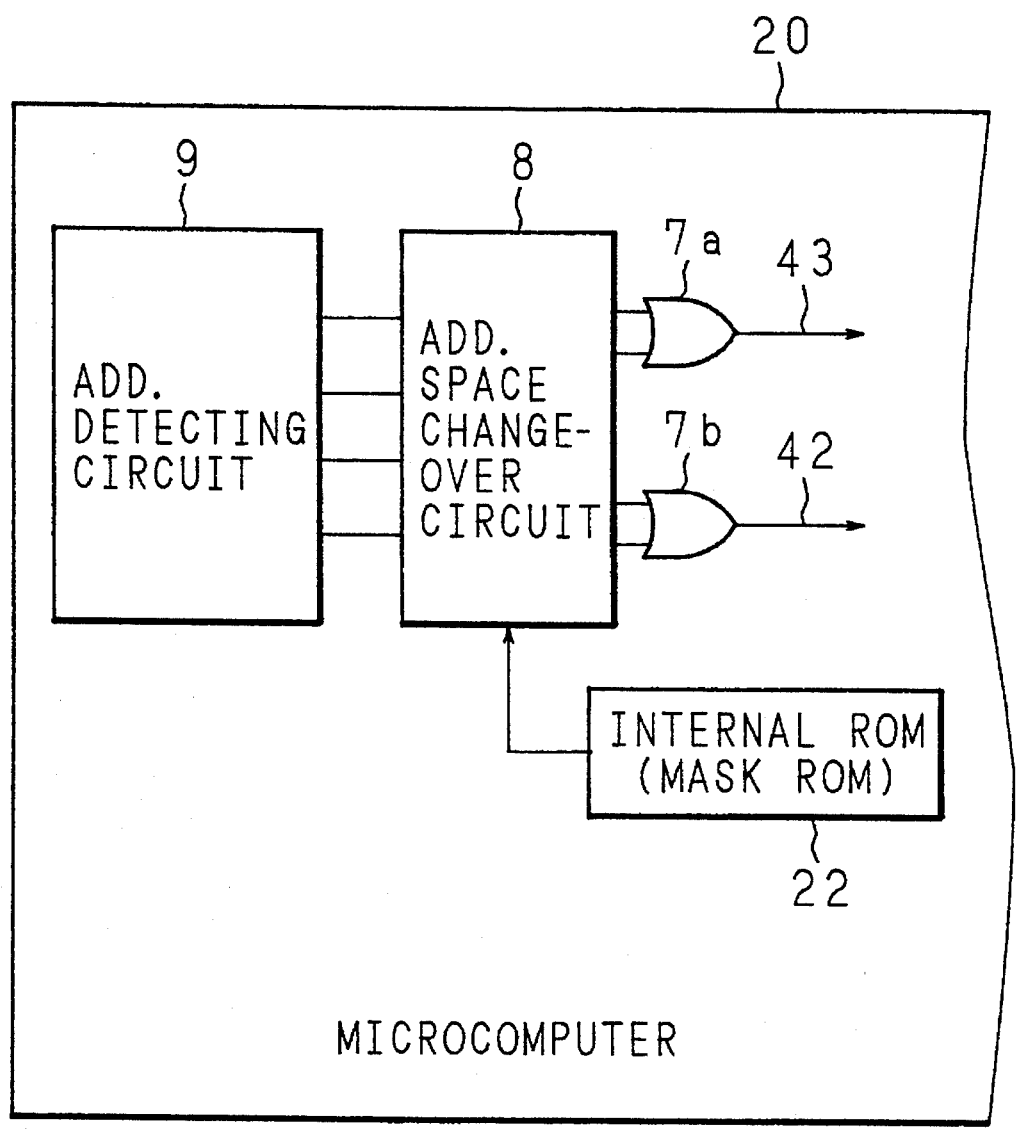
FIG. 9 is a block diagram showing the configuration of an essential portion of the third embodiment of the microcomputer system of the invention.

FIG. 9 is a block diagram showing a configuration of an essential portion of the third embodiment of such a microcomputer system of the invention, wherein a value of 1 bit in the internal ROM 22 configured as a mask ROM is given to the address space change-over circuit 8.

Consequently, similar effects as those of the second embodiment can be obtained by selecting a mask pattern so that the value stored in the mode set bit of the internal ROM 22 that is a mask ROM becomes "0" or "1" in the manufacturing process of the microcomputer 20.

[Fourth Embodiment]

Figure 10:
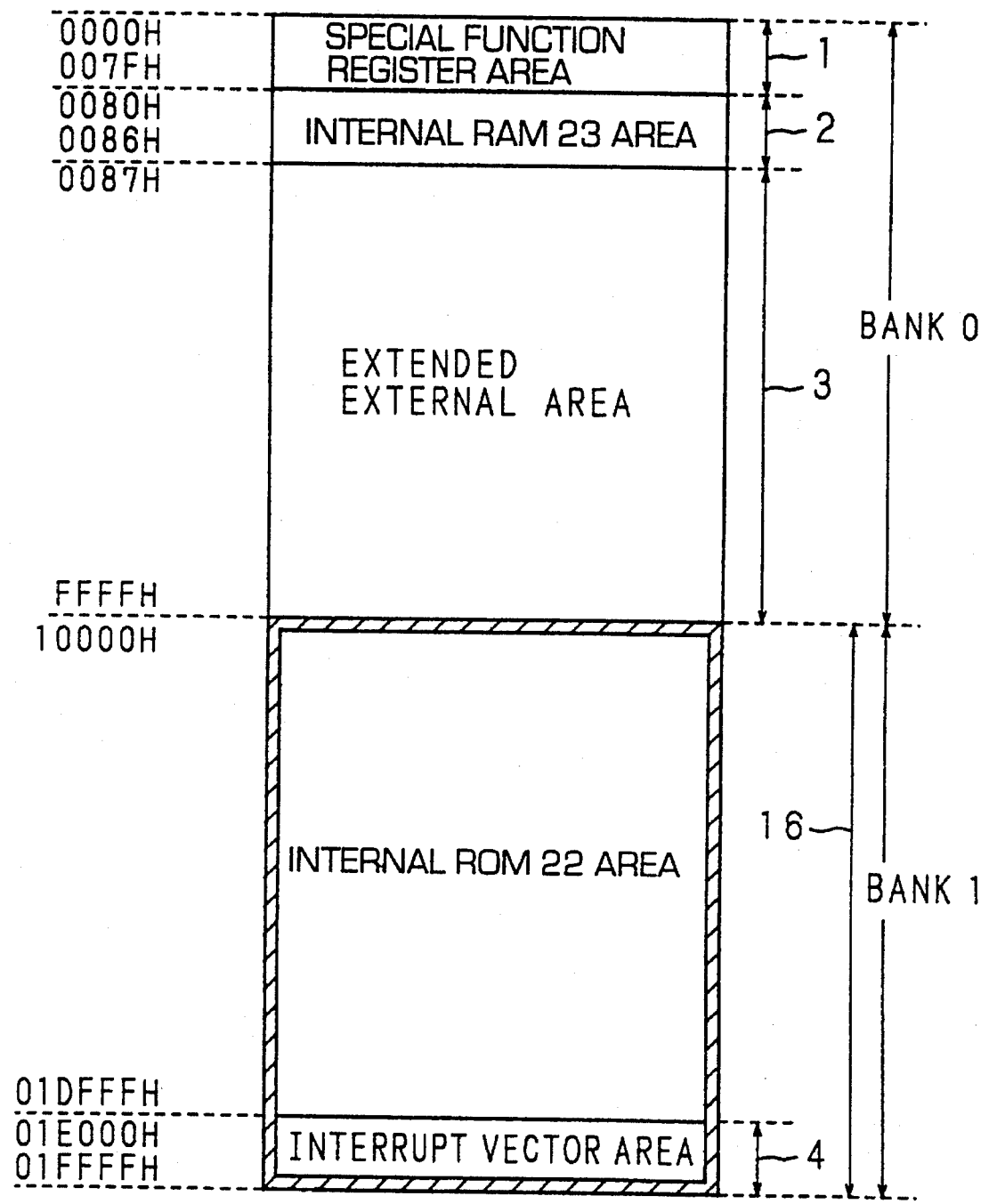
FIG. 10 is a schematic diagram of an address space map showing address allocation of the fourth embodiment of the microcomputer system of the invention.

FIG. 10 is a schematic diagram of an address space map showing the address allocation of the fourth embodiment of the microcomputer system of the invention.

The fourth embodiment is based on a concept as described below. In the first embodiment mentioned above, it is desirable to allocate the interrupt vector area 4 to a fixed common area in all cases, because the microcomputer 20 changes over the internal ROM area according to the execution of the program. In the second and the third embodiments described above, however, the microcomputer 20 does not change over the internal ROM area according to the execution of the program, but the area to be allocated for the internal ROM is fixed at the time of shipment as a product. Therefore, there arises no problem also with respect to the interrupt vector area regardless of which area in the address space it is allocated to, as far as it is fixed. In this embodiment, based on such a conception, entire internal ROM area including the interrupt vector area is allocated in such a way that overlap will not be caused between the single-chip mode and the memory extension mode.

In FIG. 10, reference numerals 1, 2, 3 and 4 denote the SFR area, the internal RAM area, the extended external area and the interrupt vector area, respectively, similarly to the case shown in FIG. 6.

The fourth embodiment shown in FIG. 10 differs from the first embodiment shown in FIG. 6 in that the entire area from address "0087H" to "FFFFH", other than the SFR area 1 and the internal RAM area 2 of the bank 0 is allocated to the extended external area 3, and the entire internal ROM area including the interrupt vector area 4 is allocated to the entire area of the bank 1 as shown by reference numeral 16.

Figure 11:
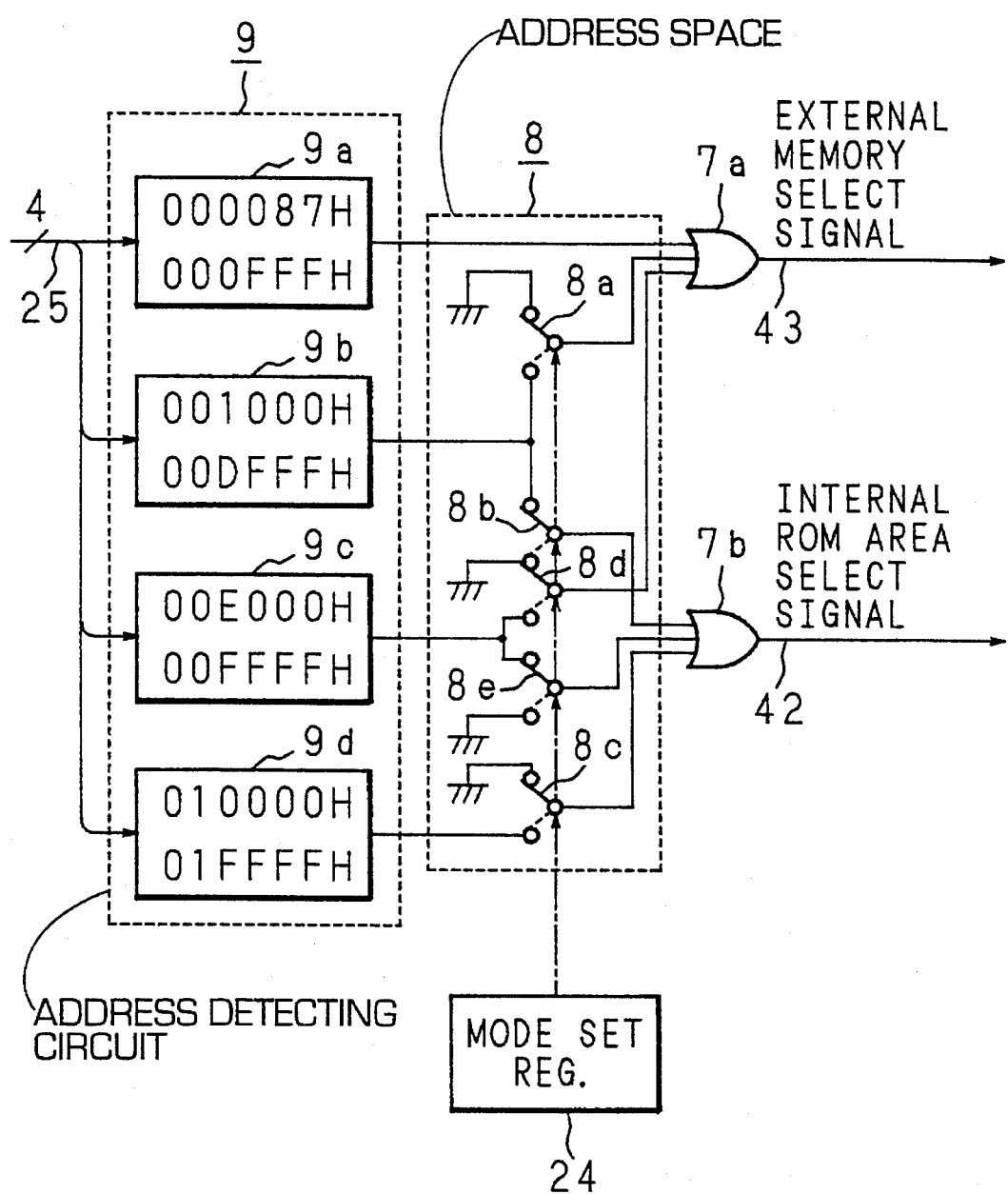
FIG. 11 is a block diagram showing an example of configuration of address space changing-over means provided in the microcomputer system of the invention to enable the address area allocation shown in FIG. 10.

FIG. 11 is a block diagram showing an example of configuration of address space changing-over means provided in the microcomputer 20 of the fourth embodiment of the microcomputer system of the invention to enable the address area allocation as described above.

Because the configuration of the address space changing-over means shown in FIG. 11 is basically the same as the address space changing-over means of the first embodiment shown in FIG. 7, only the difference therebetween will be described be low.

In the configuration shown in FIG. 11, the OR gate 7a has three inputs instead of two inputs, and the fourth address detector 9d is so arranged as to output an "H" level signal when it detects an address in a range from address "010000H" to "01FFFFH" instead of an address in a range from address "010000H" to "01DFFFH". Further, the address space change-over circuit 8 is provided with a fourth switching element 8d whose first terminal is grounded, second terminal is connected to an output signal of the third address detector 9c, and common terminal is connected to the third input terminal of the OR gate 7a, and a fifth switching element 8e whose first terminal is connected to the output signal of the third address detector 9c, second terminal is grounded, and common terminal is connected to the second input terminal of the OR gate 7b, added therein.

Connected to the first and the second input terminals of the OR gate 7a that is changed to 3-input configuration are the output of the first address detector 9a and the common terminal of the switching element 8a, respectively, similarly to the configuration shown in FIG. 7, and the common terminal of the newly added switching element 8d is connected to the third input terminal as described above.

Although the switching elements 8a, 8b, 8c, 8d, 8e provided in the address space change-over circuit 8 are described as mechanical switches in the above description, it is merely for the sake of convenience of description. They can of course be constituted of transistors, gate elements or the like in practice.

Now operation of the fourth embodiment of the micro-compurer system of the invention will be described below.

When value "0" is written as the mode select bit in the mode set register 24 by the signal input terminal 12 shown in FIG. 8, or when value "0" is written as the mode select bit by the mask ROM shown in FIG. 9, memory area allocation becomes that of the case where 60K bytes are allocated to the built-in ROM in the conventional microcomputer system shown in FIG. 5. That, is, as indicated by solid lines in FIG. 11, the address space change-over circuit 8 is controlled so that the switching element 8a is grounded to output an "L" level signal to the OR gate 7a, the switching element 8b outputs the output signal of the second address detector 9b to the OR gate 7b, the switching element 8c is grounded to out;put an "L" level signal to the OR gate 7b, the switching element 8d is grounded to output an "L" level signal to the OR gate 7a, and the switching element 8e outputs the output signal of the third address detector 9c to the OR gate 7b.

As a consequence, to the OR gate 7a, the output signal of the first, address detector 9a, an "L" level signal and another "L" level signal are inputted, and therefore the output signal of the OR gate 7a becomes the same as the output signal of the first address detector 9a. And to the OR gate 7b, the output signal of the second address detector 9b, the output signal of the third address detector 9c and an "L" level signal are inputted, and therefore the output signal of the OR gate 7b becomes the OR signal of the output signal of the second address detector 9b and the output signal of the third address detector 9c.

Because of such an operation of the address space change-over circuit 8, when the CPU 21 outputs an address signal in a range from address "000087H" to "000FFFH", the output signal of the OR gate 7a turns into "H" level. In other words, the OR gate 7a selects the area from address "000087H" to "000FFFH" in the bank 0 as the extended external area. When an address signal in a range from address "001000H" to "01DFFFH" is outputted from the CPU 21, the output signal of the OR gate 7b turns into "H" level. In other words, the OR gate 7b selects the area from address "00E000H" to "00FFFFH" in the bank 0 as the internal ROM area. This arrangement is equivalent to the memory area allocation shown in FIG. 5 where 60K bytes are allocated to the built-in ROM in the conventional microcomputer system.

On the other hand, when a value "1" as the mode select bit is written in the mode set register 24, the address change-over circuit 8 is controlled so that, as indicated by dashed lines in FIG. 11, the switching element 8a outputs the output signal of the second address detector 9b to the OR gate 7a, the switching element 8b is grounded to output an "L" level signal to the OR gate 7b, the switching element 8c outputs the output signal of the fourth address detector 9d to the OR gate 7b, the switching element 8d outputs the output signal of the third address detector 9c to the OR gate 7a and the switching element 8e is grounded to output all "L" level signal to the OR gate 7b.

As a consequence, to the OR gate 7a, the output signal of the first address detector 9a, the output signal of the second address detector 9b and the output signal of the third address detector 9c are inputted, and the output signal of the OR gate 7a becomes the OR signal of the three output signals. And to the OR gate 7b, an "L" level signal, the output signal of the fourth address detector 9d and another "L" level signal are inputted, and the output signal of the OR gate 7b becomes only the output signal of the fourth address detector 9d.

Because of such an operation of the address space change-over circuit 8, when the CPU 21 outputs an address signal in a range from address "000087H" to "00FFFFH", the OR gate 7a selects the area 3 from address "000087H" to "00FFFFH" in the bank 0 as the extended external area by turning the external memory space select signal 43 into "H" level. When an address signal in a range from address "010000H" to "01FFFFH" is outputted from the CPU 21, the OR gate 7b selects the area 16 from address "010000H" to "01FFFFH" in the bank 1 as the internal ROM area by turning the internal ROM area select signal 42 into "H" level. In this case, the entire 64K bytes in the internal ROM area are so shifted as to be allocated into the bank 1.

Thus because the entire internal ROM area including the interrupt vector area 4 is allocated to the bank 1, it is made possible to allocate the internal ROM area and the extended external area separately in different banks.

[Fifth Embodiment]

Now the fifth embodiment of the microcomputer system of the invention will be described below.

The fifth embodiment is based on the following concept. In the first embodiment mentioned above, the microcomputer 20 relocates the internal ROM area from the bank 0 to the bank 1 as the program is executed. In this fifth embodiment, in contrast, the area of the bank 1 is divided into a plurality of sections in advance so that each of these sections can be relocated into the bank 1 as required.

Figure 12:
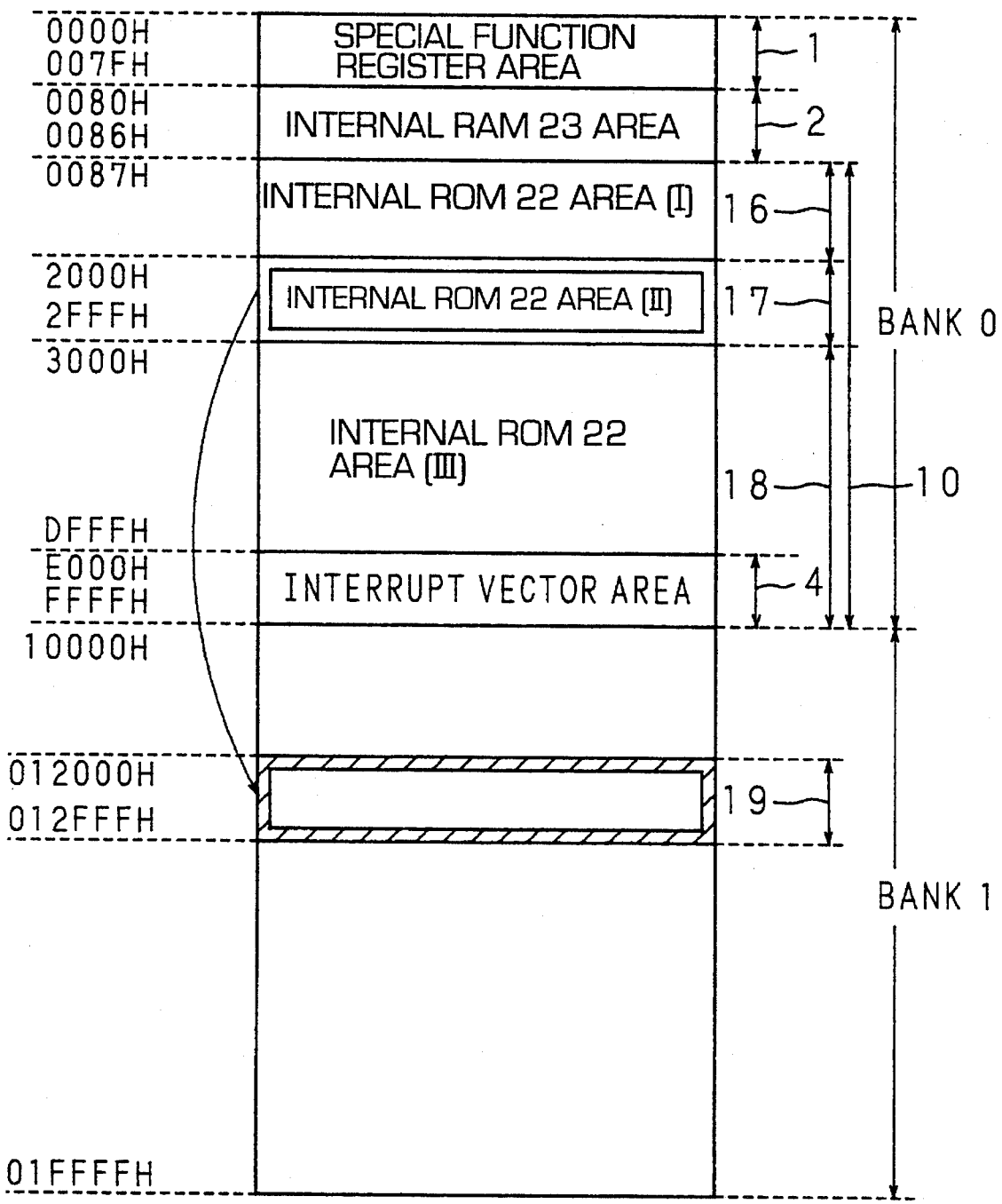
FIG. 12 is a schematic diagram showing relocation of the address space in the fifth embodiment, of the microcomputer system of the invention.

FIG. 12 is a schematic diagram showing the relocation of the address space of the microcomputer system of the fifth embodiment.

Figure 3:
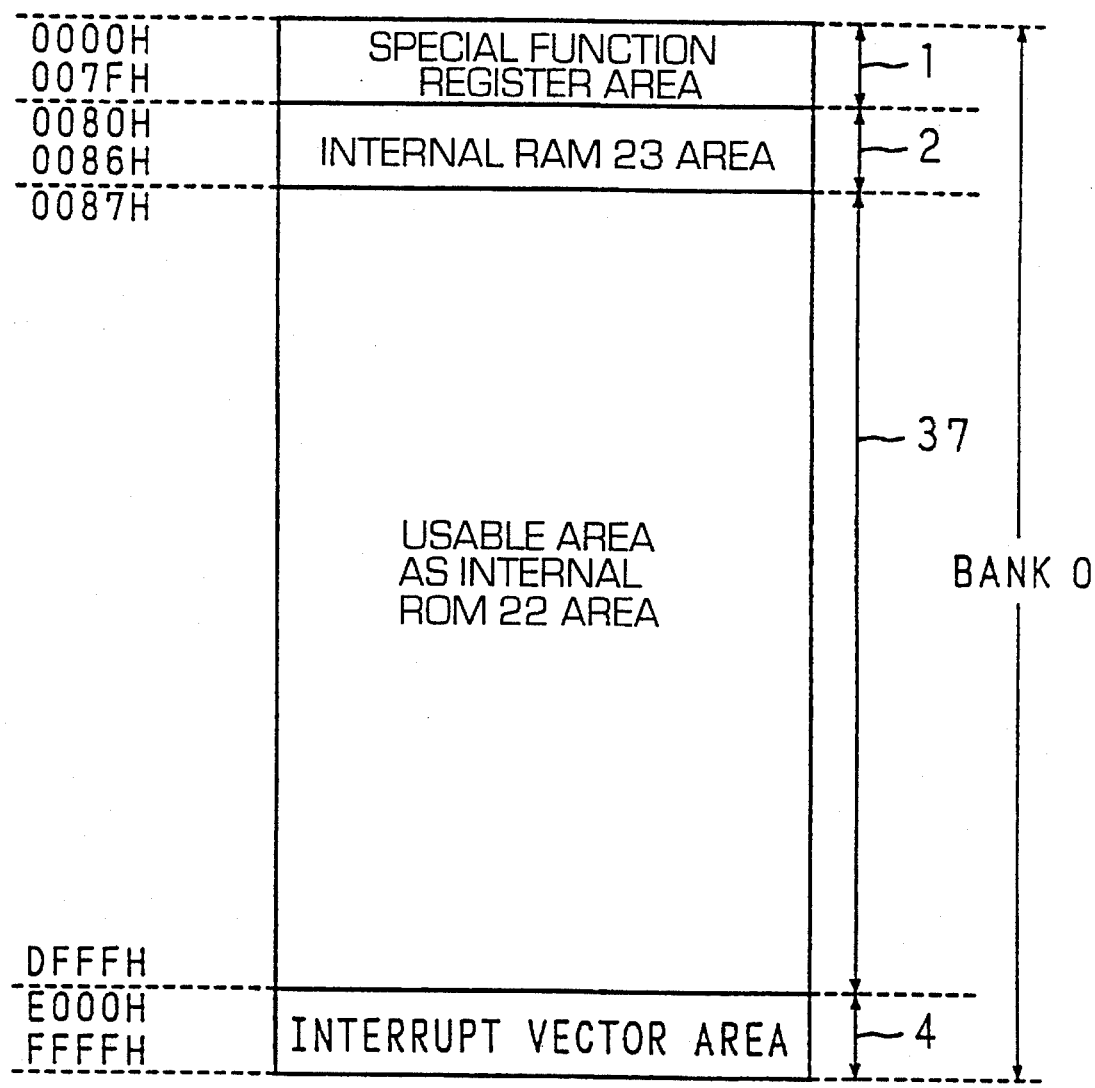
FIG. 3 is a schematic diagram showing an example of an address allocation in the conventional microcomputer system under extended memory mode.
Figure 4:
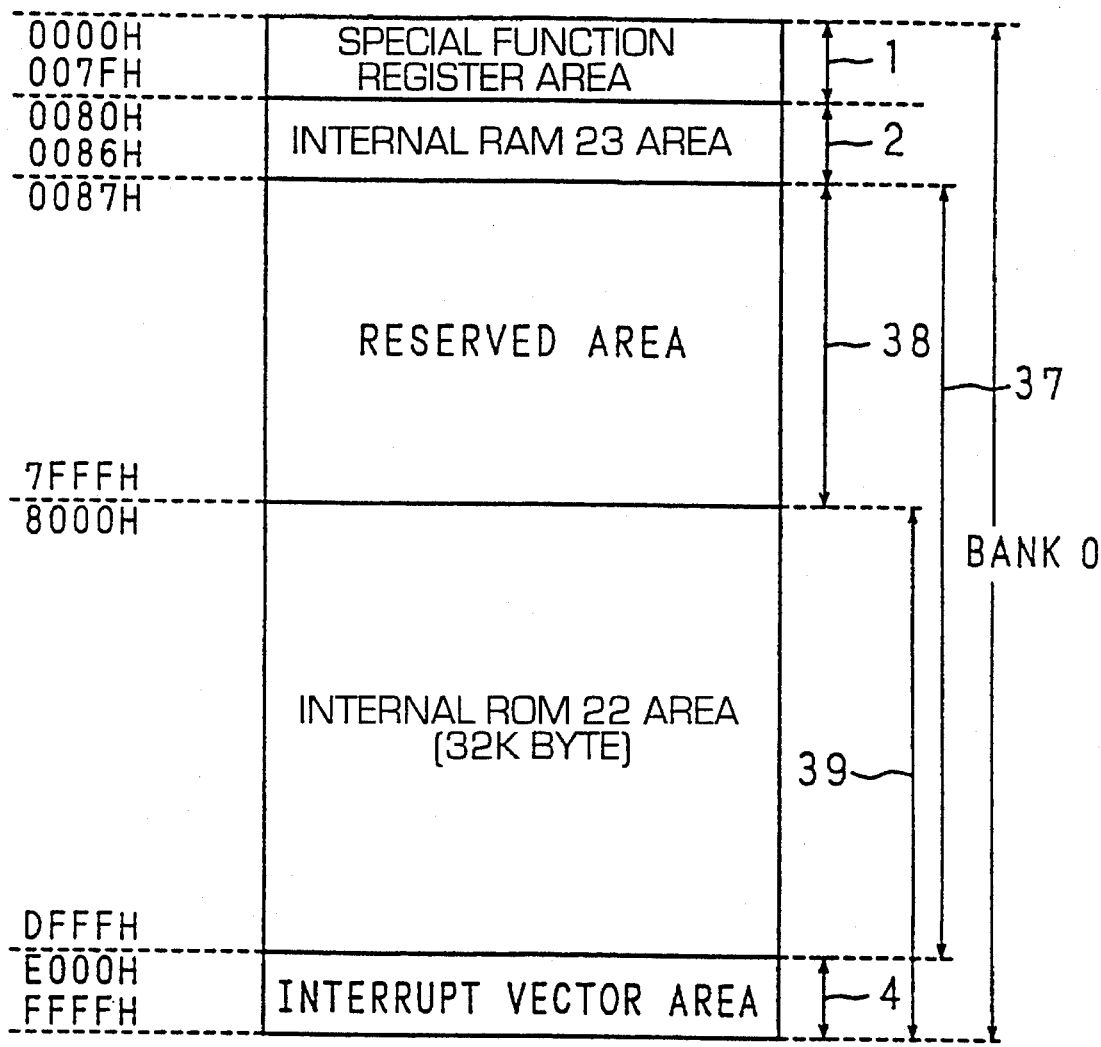
FIG. 4 is a schematic diagram showing another example of an address allocation in the conventional microcomputer system under extended memory mode.

In FIG. 12, reference numerals 1 and 2 in the bank 0 denote the SFR area and the internal RAM area, respectively, similar to those described previously. Reference numeral 10 denotes an area which can be used as the internal ROM area including the interrupt vector area 4, corresponding to the area combining the area denoted by reference numeral 37 and the area denoted by reference numeral 4 of the prior art shown in FIG. 3.

It is assumed that an internal ROM area (II) from address "2000H" to "2FFFH" indicated by reference numeral 17 in the area indicated by reference numeral 10 is relocated to an area indicated by reference numeral 19 in the bank 1, while an internal ROM area (I) from address "0087H" to "1FFFH" indicating by reference numeral 16 and an internal ROM area (III) from address "3000H" to "FFFFH" indicated by reference numeral 18 are areas that are not relocated.

Figure 13:
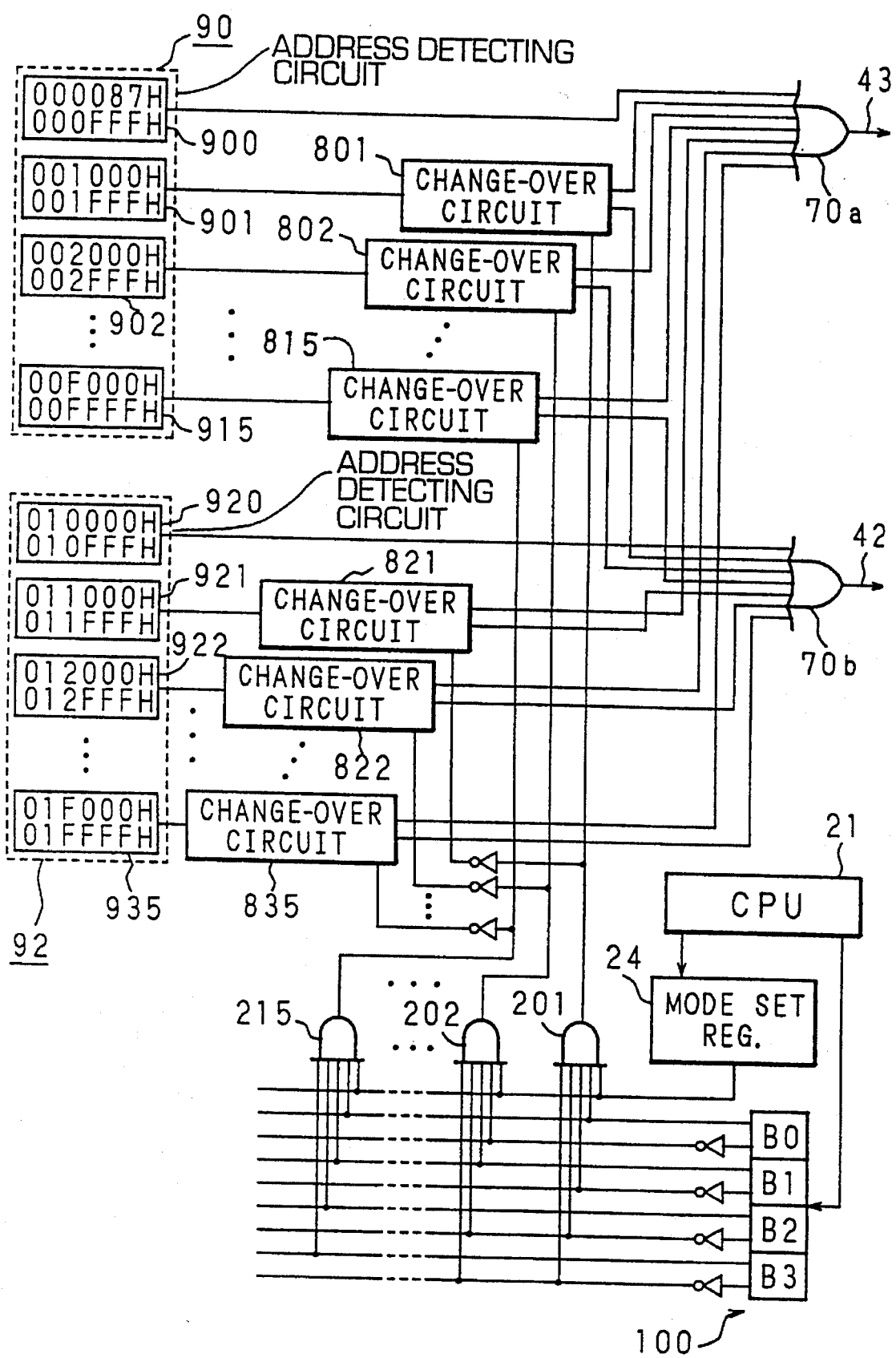
FIG. 13 is a block diagram showing an example of configuration of address space changing-over means provided in the fifth embodiment of the microcomputer system of the invention to enable relocation of the address area shown in FIG. 12.

FIG. 13 is a block diagram showing an example of configuration of address space changing-over means provided in the fifth embodiment of the microcomputer system of the invent ion to enable the relocation of the address area as described above.

in FIG. 13, reference numerals 21 and 24 denote a CPU and a mode set register similar to those in the first embodiment shown in FIG. 7, and functions thereof are also similar.

Reference numeral 90 denotes an address detecting circuit for the bank 0, and reference numeral 92 denotes an address detecting circuit for the bank 1. The address detecting circuit 91 has first through 16th address detectors 900 through 915 installed therein, and the address detecting circuit 92 has first through 16th address detectors 920 through 935 installed therein.

An "H" level signal is outputted from the address detector 900 when an address signal in a range from address "000087H" to "000FFFH" is detected, from the address detector 901 when an address signal in a range from address "001000H" to "001FFFH" is detected, from the address detector 902 when an address signal in a range from address "002000H" to "002FFFH" is detected, and so on, up to that from the address detector 915 when an address signal in a range from address "00F000H" to "00FFFFH" is detected.

An output signal of the address detector 900 is inputted to the OR gate 70a, an output signal of the address detector 901 is inputted to the change-over circuit 801, an output signal of the address detector 902 is inputted to the change-over circuit 802 and so on, up to an output signal of the address detector 915 being inputted to the change-over circuit 815. First output signals of each change-over circuits 801 through 815 are inputted to the OR gate 70a and second output signals of the same are inputted to the OR gate 70b.

An output signal of the address detector 920 is inputted to the OR gate 70b, an output signal of the address detector 921 is inputted to the change-over circuit 821, an output signal of the address detector 922 is inputted to the change-over circuit, 822 and so on, up to an output signal of the address detector 935 being inputted to the change-over circuit 835. First output signals of the change-over circuits 821 through 835 are inputted to the OR gate 70a and second output signals of the same are inputted to the OR gate 70b.

Reference numeral 100 denotes an area set, register where 4-bit data B0–B3 is written by the CPU 21 to specify an area to be relocated from the bank 0 to the bank 1. Each bit B0–B3 of the area set register 100 is outputted intact as the first output signal and is also inverted by inverters to be output ted as the second output signal.

Reference numerals 201 through 215 all denote 5-input AND gates. To each of the AND gates 201 through 215, five input signals are inputted; the output signal of the mode set register 24 as a common input signal and the first or the second outputs of each of the bits B0–B3 of the area set register 100. Output signals of the AND gates 201 through 215 are directly inputted to the change-over circuits 801 through 815, respectively, and are also inputted to the change-over circuits 821 through 835 via inverters, respectively.

Input signals of the AND gates 201 through 215 are so set that an output signal of one of the AND gates 201 through 215 becomes in "H" level according to the 15 bit patterns except for "0000" among the 16 patterns of the data stored in the area set register 100, under the condition that value "1" is written in the mode set register 24, while detail will not be described here.

Specifically, when value "1" is written in the mode set register 24 and data "0010" is written in the area set register 100, for example, only the output signal of the AND gate 202 turns into "H" level and is directly inputted to the change-over circuit 802, while being inputted to the change-over circuit 822 via an inverter at the same time.

Figure 14:
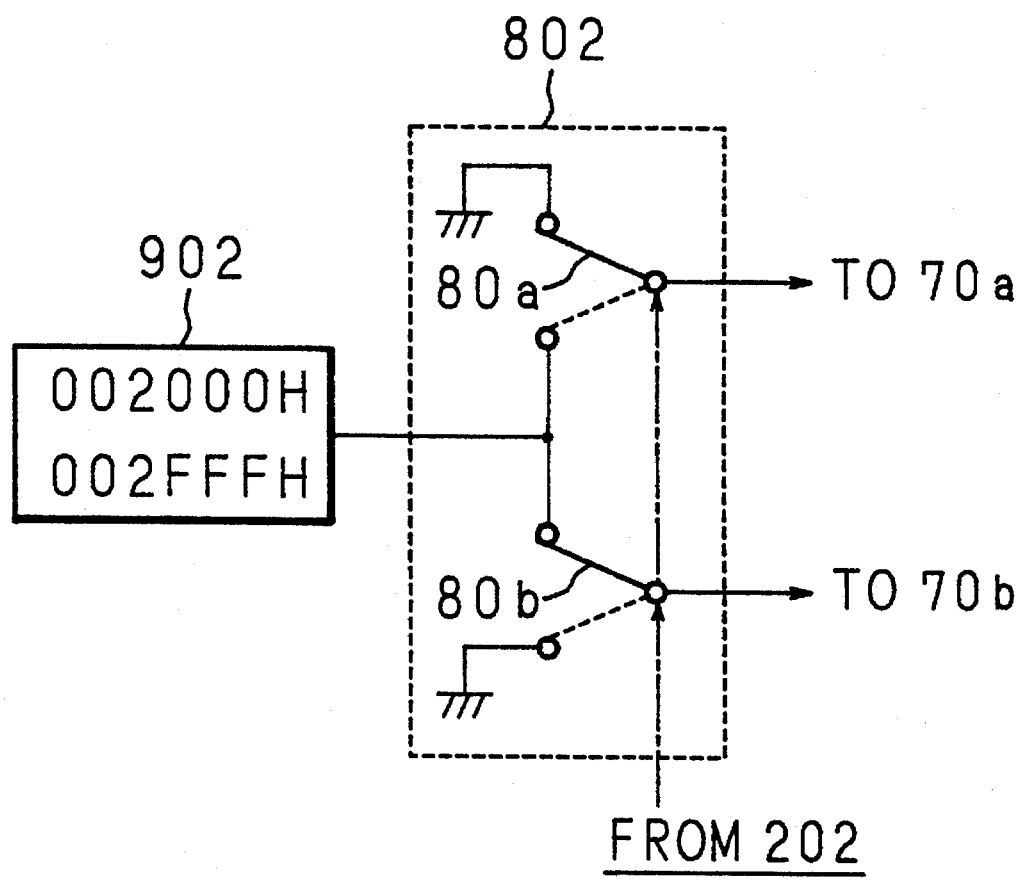
FIG. 14 is a circuit diagram showing the configuration of a change-over circuit shown in FIG. 13.

FIG. 14 is a circuit diagram showing the configuration of the change-over circuit 802 whereto the output signal of the address detector 902 and the output signal of the AND gate 202 are inputted. Other change-over circuits 801, 803 through 815 and 821 through 835 are also made in the same configuration.

In FIG. 14, reference numeral 80a denotes a first switching element and 80b denotes a second switching element. A first terminal of the first, switching element 80a is grounded, a second terminal of the same is connected to the output signal of the address detector 902, and a common terminal of the same is connected to the input terminal of the OR gate 70a. A first terminal of the second switching element 80b is connected to the output signal of the address detector 902, a second terminal of the same is grounded, and a common terminal of the same is connected to the input terminal of the OR gate 70b.

When the output signal of the AND gate 202 is at "L" level, the first switching element 8a is grounded to output an "L" level signal to the OR gate 70a, and the second switching element 80b outputs the output signal of the address detector 902 to the OR gate 70b, as indicated by solid lines in FIG. 14. Conversely, when output signal of the AND gate 202 is at "H" level, the first switching element 80a outputs the output signal of the address detector 902 to the OR gate 70a, and the second switching element 80b is grounded to output an "L" level signal to the OR gate 70b, as indicated by dashed line in FIG. 14.

Although the switching elements 80a, 80b provided in the change-over circuit 802 are described as mechanical switches in the above description, it is merely for the sake of convenience in description. They can of course be constituted of transistors, gate elements or the like in practice.

Similarly, the other change-over circuits 801 and 803 through 815 output "L" level signals to the OR gate 70a when the output signals of the AND gates 201 and 203 through 215 which are connected respectively thereto are "L" level, and output the output signals of the address detectors 901 and 903 through 915 which are connected respectively thereto to the OR gate 70b. Conversely, when the output signals of the AND gates 201 and 203 through 215 which are connected respectively thereto are "H" level, the change-over circuits 801 and 803 through 815 output the output signals of the address detectors 901 and 903 through 915 which are connected respectively thereto to the OR gate 70a and output "L" signals to the OR gate 70b.

On the other hand, the change-over circuits 821 through 835, when the output signals of the AND gates 201 through 215 which are connected respectively thereto are "L" level, output the output signals of the address detectors 901 through 915 which are connected respectively thereto to the OR gate 70a, and output "L" level signals to the OR gate 70b. Conversely, when the output signals of the AND gates 201 through 215 which are connected respectively thereto are "H" level, the change-over circuits 821 through 835 output "L" signals to the OR gate 70a, and output the output signals of the address detectors 901 through 915 which are connected respectively thereto to the OR gate 70b.

Operation of the fifth embodiment of the microcomputer system as described above will now be described below.

Normally, the CPU 21 writes "0" into the mode set register 24 and therefore output signals of the AND gates 201 through 215 are at "L" level. Consequently, the change-over circuits 801 through 815 output the output signals of the address detectors 901 through 915 which are connected respectively thereto to the OR gate 70a, and output "L" level signals to the OR gate 70b, respectively. An output signal of the address detector 900 is also inputted to the OR gate 70a. On the other hand, the change-over circuits 821 through 835 output "L" level signals to the OR gate 70a, and output, the output signals of the address detectors 901 through 915 which are connected respectively thereto to the OR gate 70b. An output signal of the address detector 920 is also inputted to the OR gate 70b.

Thus when an address signal in a range from address "000087H" to "00FFFFH" is outputted from the CPU 21, the output-signal of the OR gate 70a, namely the external memory space select signal 43 indicating that an address other than the internal ROM area is being accessed, turns into "H" level. When an address signal in a range from address "010000H" to "01FFFFH" is outputted from the CPU 21, the output signal of the OR gate 70b, namely the internal ROM area select signal 42 indicating that an address of the internal ROM is being accessed, turns into "H" level.

For example, during execution of the program by the microcomputer 20, when it becomes necessary to relocate an area from address "002000H" to "002FFFH" of the bank 0 indicated by reference numeral 17 in FIG. 12 to the bank 1, the CPU 21 writes "1" into the mode set register 24 and writes data "0010" for specifying the area 17 into the area set register 100. This causes the output signal of the AND gate 202 to become "H" level and is given to the change-over circuit 802, and therefore the change-over circuit 802 is put into such a state as outputs an "L" level signal to the OR gate 70a and outputs the output signal of the address detector 901 to the OR gate 70b. On the other hand, because an "L" level signal obtained by inverting the output signal of the AND gate 202 is inputted to the change-over circuit 822, the change-over circuit 822 outputs the output signal of the address detector 901 to the OR gate 70a and outputs an "L" level signal to the OR gate 70b.

The operations described above cause the area 17 which has been allocated to a portion of the bank 0 from address "2000H" to "2FFFH" to be relocated to the area 19 from address "01200011" to "012FFFH" of the bank 1, as shown in FIG. 12.

The fifth embodiment described above has such a configuration as the areas of the bank 0 sectioned in advance are relocated to predetermined corresponding areas of the bank 1. It is also made possible to relocate the areas of the bank 0 sectioned in advance to arbitrary areas among the areas of the bank 1 sectioned in advance, by employing such a configuration as two sets of area set registers 100 and two sets of AND gates 201 through 215 corresponding thereto are provided so that the change-over circuits 801 through 815 and the change-over circuits 821 through 835 are controlled individually by means of the two sets of the AND gates 201 through 215.

According to the microcomputer system of the invention, as described in detail above, allocation of the internal ROM area in the address space can be changed over so that the optimum allocation is obtained either in the case of single-chip microcomputer or in a system with external memory connected thereto.

The changing-over operation is carried out according to the necessity for executing a program of the microcomputer system itself, by the input of a signal from the outside according to whether the microcomputer is to be shipped either as a product in the form of a single-chip microcomputer or in the form of a system with external memory connected thereto, or in case where the internal ROM comprises a mask ROM, by presetting it in the manufacturing process.

Further, in case where switching of the mode does not depend on the execution of a program, it is also made possible to increase the execution speed through exclusive programming by allocating the entire internal ROM area including the interrupt vector area in a more preferable address space allocation.

Furthermore, it is possible to divide the internal ROM area into a plurality of sections in advance and allocate some of the sections to other areas according to the execution of a program, making it possible to increase the execution speed through exclusive programming.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. A microcomputer system, comprising:

a single-chip microcomputer, in which a CPU, executing a program, and internal resources, including an internal ROM being accessed through execution of said program by said CPU, are configured on one chip, said internal ROM having an address space including an interrupt vector area for storing addresses of programs for interrupt processing and areas whereto addresses of said internal ROM are allocated; and external resources connected with said single-chip microcomputer and being accessed through execution of the program by said CPU;

wherein said system can operate in either a first mode under which said CPU can access only said internal resources and said internal ROM is allocated to a first area in said address space, or a second mode under which said CPU can access both of said internal resources and said external resources and said internal ROM is allocated to a second area in said address space, said second area excluding said interrupt area, further comprising:

address decoding means for decoding an address outputted from said CPU and accessing said address space in one of said first and second modes, address space changing-over means for making said address decoding means access said first area of said internal ROM when a first value indicating said first mode is set as an address space changing-over bit, and for making said address decoding means access said second area of said internal ROM when a second value indicating said second mode is set as said address space changing-over bit.

2. The microcomputer system as set forth in claim 1, further comprising a register into which said address space changing-over bit is written;

wherein said CPU can write the first value or the second value into said register according to an execution of the program.

3. The microcomputer system as set forth in claim 1, further comprising:

a register into which said address space changing-over bit is written; and a signal input terminal;

wherein the first value or the second value is written into said register according to a voltage level inputted to said signal input terminal.

4. The microcomputer system as set forth in claim 3, wherein said address space changing-over means makes said address decoding means access to the entire area of said internal ROM in either of the cases where the first value is set as said address space changing-over bit and said CPU outputs an address of said first area which corresponds to addresses of the entire area of said internal ROM, and where the second value is set as said address space changing-over bit and said CPU outputs an address of a second area other than said first area, which second area corresponds to all addresses of the entire area of said internal ROM.

5. The microcomputer system as set forth in claim 3, wherein said address space changing-over means makes said address decoding means access all addresses of the entire area of said internal ROM corresponding to an address outputted from said CPU, in either of the cases where the first value is set as said address space changing-over bit and said CPU outputs an address of any of a plurality of sectioned areas in said first area, which corresponds to all addresses of the entire area of said internal ROM, and when the second value is set as said address space changing-over bit and an address of an area other than said first area is outputted from said address space changing-over means correspondingly to an address outputted by said CPU.

6. The microcomputer system as set forth in claim 1, wherein said internal ROM consists of a mask ROM, and the first or the second value is written as said address space changing-over bit into said mask ROM at manufacturing process thereof.

7. The microcomputer system as set forth in claim 6, wherein said address space changing-over means makes said address decoding means access all addresses of the entire area of said internal ROM in either of the cases where the first value is set as said address space changing-over bit and said CPU outputs an address of said first area which corresponds to all addresses of the entire area of said internal ROM, and where the second value is set as said address space changing-over bit and said CPU outputs an address of a second area other than said first area which corresponds to all addresses of the entire area of said internal ROM.

8. The microcomputer system as set forth in claim 6, wherein said address space changing-over means makes said address decoding means access all addresses of the entire area of said internal ROM corresponding to an address outputted from said CPU, in either of the cases where the first value is set as said address space changing-over bit and said CPU outputs an address of any of a plurality of sectioned areas in said first area which corresponds to all addresses of the entire area of said internal ROM, and when the second value is set as said address space changing-over bit and an address of an area other than said first area is outputted from said address space changing-over means correspondingly to an address outputted by said CPU.

* * * * *